United States Patent Office 3,681,235
Patented Aug. 1, 1972

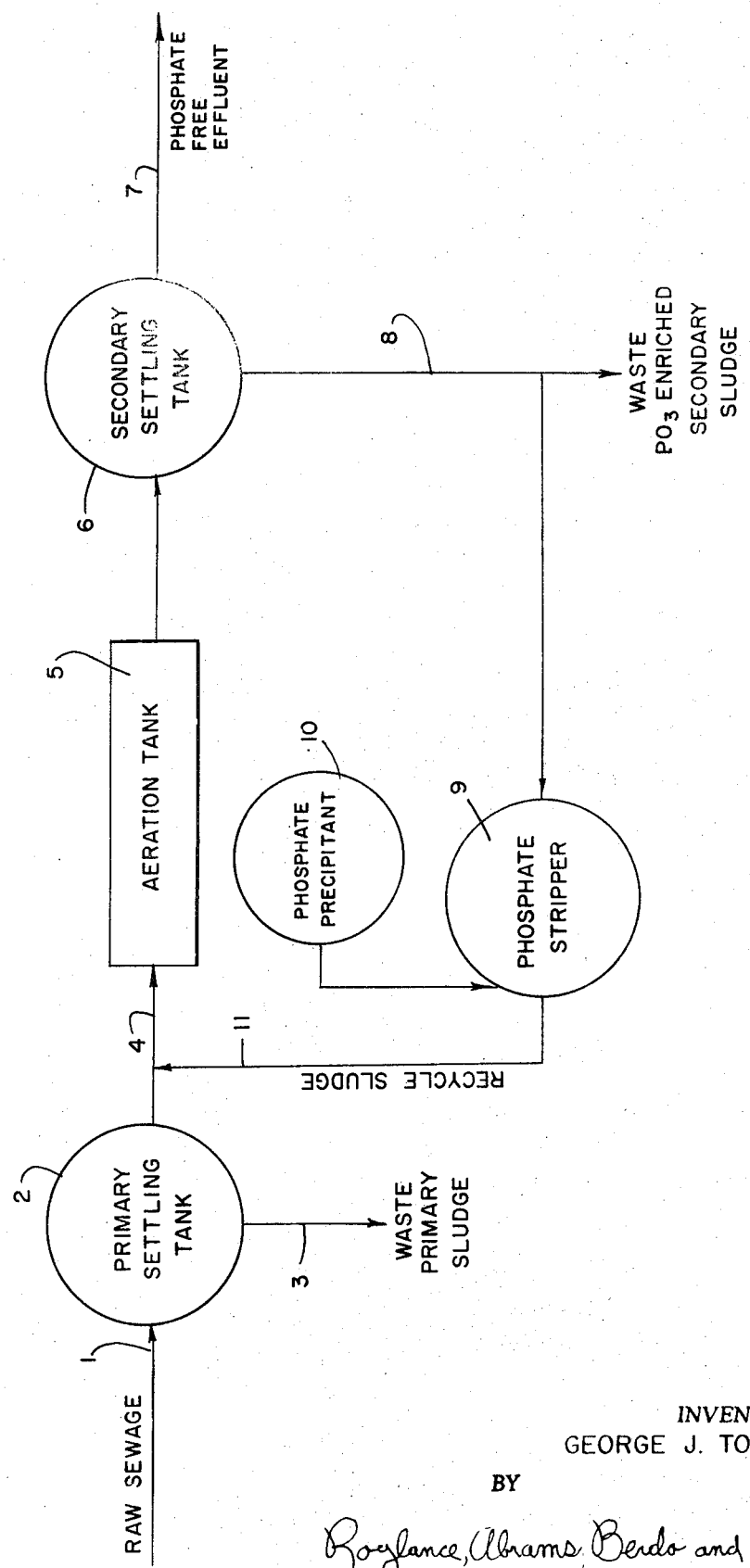

3,681,235
INTERNAL PRECIPITATION OF PHOSPHATE FROM ACTIVATED SLUDGE
George J. Topol, Silver Spring, Md., assignor to Biospherics Incorporated, Rockville, Md.
Filed Mar. 11, 1971, Ser. No. 123,309
Int. Cl. C02c 1/06
U.S. Cl. 210—6    4 Claims

ABSTRACT OF THE DISCLOSURE

There is disclosed an activated sludge sewage treatment process in which influent sewage material is mixed with activated sludge containing precipitated phosphate particles to provide a mixed liquor. The mixed liquor is aerated to cause the micro-organisms present in the sludge to take up phosphate. Phosphate-enriched sludge is separated from the mixed liquor to provide a substantially phosphate-free effluent. The phosphate-enriched sludge is treated to cause the micro-organisms in the sludge to release phosphate to the liquid phase and a phosphate precipitant is added to precipitate the water soluble phosphate content. The sludge containing the precipitated phosphate particles is recycled for mixing with influent sewage material.

---

This invention relates to a process for treating raw or treated sewage to obtain a substantially phosphorous-free effluent which is returned to natural water resources.

In the conventional activated sludge system in use today, sewage is subjected to the usual screening and preliminary sedimentation procedures, then mixed with activated sludge recycled from a settling tank to form a mixed liquor and the mixed liquor is subjected to aeration. During aeration of the mixed liquor, the organisms present cause the aerobic decomposition of solids and a high degree of BOD removal is achieved.

Phosphates, which are present in organic wastes and detergents, escape conventional sewage treatment processes and are released with the effluent into natural water resources, e.g., lakes, rivers and streams. These phosphates result in over fertilization or eutrophication of waters causing unsightly algal blooms and serious pollution problems.

It is known that aeration of the mixed liquor in an activated sludge sewage treatment process initially causes the micro-organisms present to take up phosphate. U.S. Pat. No. 3,236,766 discloses a process which utilizes this phenomenon for removing phosphates from sewage. According to the process disclosed in that patent, the pH of raw sewage is adjusted, if necessary, to maintain a range of from about 6.2 to about 8.5, the sewage is mixed with activated sludge to form a mixed liquor, the mixed liquor is aerated to maintain a dissolved oxygen content of at least 0.3 mg. per liter in the mixed liquor and a phosphate-enriched sludge is separated from the mixed liquor to provide a substantially phosphate-free effluent. The phosphate-enriched sludge is treated to reduce the phosphate content thereof prior to recycling for mixing with the influent sewage. This may be accomplished by maintaining the phosphate-enriched sludge in an anaerobic condition for several hours or at a pH of less than 6.5 for 10 to 12 minutes. The anaerobic condition and the acidic pH induce considerable quantities of intracellular phosphate to leak out of the sludge into a liquid phase.

Several other processes have since been proposed for reducing the phosphate content of phosphate-enriched sludge following the aeration step in an activated sludge sewage treatment process. Thus, U.S. Pats. Nos. 3,385,785 and 3,390,077 disclose adjusting the pH of phosphate-enriched sludge to between about 3.5 and 6.0 and agitating the sludge in contact with a low phosphate-containing aqueous medium for a time sufficient to effect transfer of water-soluble phosphate material from the sludge to the aqueous phase. The phosphate-enriched aqueous medium is separated from the phosphate-depleted sludge and the phosphate-depleted sludge is recycled to form the mixed liquor.

U.S. Pat. No. 3,522,171 also discloses a method of treating sludge to reduce the phosphate content prior to recycling as seed material in the aeration zone of the activated sludge sewage treatment system. The method disclosed in this patent involves subjecting a first sludge concentrate produced in the separator successively to acidification followed by separation of a second sludge concentrate. This concentrate is diluted with a low phosphate content aqueous medium and a third sludge concentrate is separated which is the reduced phosphate content concentrate of micro-organisms to be recycled.

It has also been suggested to combine a chemical phosphate precipitating treatment with biological phosphate removal in a sewage treatment process. Thus, U.S. Pats. Nos. 3,409,545 and 3,386,911 disclose processes wherein raw sewage is first treated with lime to precipitate part of the phosphate content thereof. The effluent is then mixed with activated sludge and aerated so that the micro-organisms metabolically consume phosphate content.

U.S. Pat. No. 3,480,144 discloses the addition of a phosphate precipitant directly to the aeration zone in an activated sludge sewage treatment process. Because of the high volume of material present in the aeration tank and the relatively low concentration of phosphate, a large excess of precipitant, e.g., approximately double the stoichiometric amount required, must be used.

It is an object of this invention to provide a process for reducing the phosphate content and for promoting a high degree of BOD removal in an activated sludge sewage treatment process.

It is another object of this invention to provide such a process which may be conducted using conventional sewage treatment equipment.

It is a further object of this invention to provide such a process which is attended by an improvement in the settling characteristics of the sludge and an increase in the efficiency of BOD and suspended solids removal.

These and other objects are attained by the practice of this invention which, briefly, comprises mixing influent sewage material with activated sludge to provide a mixed liquor. The mixed liquor is passed to an aeration zone wherein it is aerated to reduce the BOD content thereof and to cause the microorganisms present to take up phosphate. Phosphate-enriched sludge is separated from the mixed liquor to provide a substantially phosphate-free effluent. The phosphate-enriched sludge is passed to a phosphate stripping zone and treated to cause the micro-organisms in the sludge to release phosphate to the liquid phase. A phosphate precipitant is added to the sludge to precipitate the water-soluble phosphate content. The sludge containing the precipitated phosphate particles is recycled for mixing with influent sewage material.

The invention is illustrated in the accompanying drawing wherein the figure is a flow diagram of the phosphate removal process of this invention.

Referring to the figure, a raw sewage influent stream 1 is passed through conventional screening and grit removing units and is optionally subjected to primary settling in a tank 2 from which primary sludge is removed in line 3. The primary settled sewage is mixed with a mixture of recycled, activated sludge and precipitated phosphate hereinafter described to form a mixed liquor and is passed by line 4 to the aeration tank 5. In the aeration tank, the mixed liquor is aerated at a rate sufficient to maintain it aerobic—i.e., so that there is a measurable amount of oxygen present in the mixed liquor—in at least a part of the aeration tank for a period of 1 to 8 hours. During aeration, the bacteria present take up phosphate and consume organic matter present in the sewage. The particles of precipitated phosphate which are added to the aeration tank along with the recycled sludge present a large surface area which attract microorganisms and the nutrients necessary for the sustenance and growth of the microorganisms and enhance the phosphate uptake of the microorganisms. A high degree of BOD removal is obtained during aeration.

After aeration, the mixed liquor is fed into a secondary settling tank 6. In the secondary settling tank 6, a mixture of phosphate-enriched sludge and particles of phosphate precipitate settles and thereby separates from the liquor. The presence of the precipitated phosphate improves the settling characteristics of the sludge since the density of the mixture of sludge and precipitated phosphate is higher than that of the sludge alone. The sludge contains a substantial portion of the phosphate present in the sewage. The substantially phosphate-free effluent is discharged for disposal in a conventional manner by line 7.

The mixture of phosphate-enriched sludge and particles of phosphate precipitate is removed from the settling tank 6 by line 8. A portion of the mixture, typically about 5%, may be delivered to waste and the remainder is passed to the phosphate stripper 9. In the phosphate stripper 9, the mixture of phosphate-enriched sludge and particles of phosphate precipitate is treated to cause the micro-organisms in the sludge to release phosphate. This treatment may be accomplished by holding the mixture under anaerobic conditions as described in U.S. Pat. No. 3,236,766; by aerating the mixture as described in U.S. Pat. No. 3,654,146; or by appropriate pH adjustment—i.e., adjusting the pH to less than 6.5 and maintaining it at this pH for at least 10 minutes. This treatment causes the organisms in the sludge to release the phosphate which they have taken up in the aeration tank 5. The phosphate leaks out of the sludge into the liquid phase of the sludge.

A phosphate precipitant, e.g., an aluminum or iron salt or an alkali such as lime, is added from the source 10 to the phosphate stripper 9 in an amount sufficient to precipitate the soluble phosphate content of the sludge. The phosphate precipitant may be added to the phosphate stripper either along with the phosphate-enriched sludge or separately therefrom. Alternatively, the phosphate precipitant may be added to the sludge in a separate tank following the phosphate stripping operation. Because of the relatively low volume of sludge as compared to the volume of mixed liquor in the aeration tank, much less phosphate precipitant is required than if it were added to the aeration tank.

The mixture of activated sludge nad precipitated phosphate particles is removed from the phosphate stripper 9 and passed by line 11 for mixing with the raw sewage which is being fed to the aeration tank 5.

According to this invention, the insoluble precipitated phosphate is retained along with the activated sludge and is eventually removed from the system as phosphate-enriched waste sludge. This is accomplished through conventional wasting procedures and does not require additional equipment. Moreover, since a thickening and settling tank from which a supernatant liquid is removed and which requires special control mechanism is not required, existing equipment in a sewage treatment plant can be used.

Further, when a phosphate-enriched supernatant liquid is separated from the sludge and the supernatant is subsequently treated with a phosphate precipitant, a portion of the soluble phosphate remains behind in the activated sludge. According to this invention, substantially all of the soluble phosphate is removed from the sludge, rather than only the decantable portion. This increases the efficiency of the process and reduces the amount of aeration required to cause the micro-organisms in the aeration tank 5 to take up the phosphate.

The following example illustrates a specific embodiment of this invention:

EXAMPLE

The pH of influent raw sewage is adjusted to 7 to 8 and is passed through conventional screening and grit removing units. The raw sewage (about 1,000,000 gallons per day—g.p.d.) containing about 100 parts per million (p.p.m.) of solids is mixed with recycled activated sludge (about 190,000 g.p.d.) containing about 500 p.p.m. of phosphate precipitate. The mixed liquor is fed to an aeration zone and is aerated at a rate of 5 cubic feet of air per gallon of sewage for six hours. The effluent mixed liquor from the aeration zone is fed to a secondary settling tank. Clarified waste liquid which is substantially free of phosphate is discharged to the effluent outflow after chlorination at a rate of about 1,000,000 g.p.d. The settled mixture of phosphate-enriched sludge and particles of precipitated phosphate is withdrawn from the secondary settling tank at a rate of about 200,000 g.p.d. A portion (about 10,000 g.p.d.) is passed to waste sludge and the remainder is passed to an anaerobic phosphate stripper wherein it is held under anaerobic conditions for several hours. The conditions existing in the stripper induce considerable quantities of intracellular phosphate to leak out into the liquid phase. An approximate stoichiometric amount of alum required to precipitate the soluble phosphate present is added to the sludge and the mixture of sludge and precipitated phosphate is recycled for mixing with incoming raw sewage.

What is claimed is:

1. An activated sludge sewage treatment process which comprises mixing influent sewage material with activated sludge containing precipitated phosphate particles to provide a mixed liquor, passing said mixed liquor to an aeration zone wherein it is aerated to reduce the BOD content thereof and to cause the microorganisms present to take up phosphate, separating the phosphate-enriched sludge from the mixed liquor to provide a substantially phosphate-free effluent, passing said phosphate-enriched sludge to a phosphate stripping zone and treating it to cause the micro-organisms in the sludge to release phosphate to the liquid phase, adding a phosphate precipitant to said sludge to precipitate the water soluble phosphate content and recycling said sludge containing precipitated phosphate particles without withdrawing a supernatant liquor for mixing with the influent sewage material, said phosphate precipitating step being the only phosphate precipitating step in said activated sludge sewage treatment process.

2. A process as defined in claim 1 wherein said phosphate-enriched sludge which is separated from said mixed liquor is maintained under anaerobic conditions to cause the micro-organisms in the sludge to release phosphate to the liquid phase.

3. A process as defined in claim 1 wherein said mixed liquor is aerated for from 1 to 8 hours.

4. A process as defined in claim 1 wherein phosphate precipitant is added to said sludge in an approximate stoichiometric amount of that required to precipitate the water soluble phosphate content thereof.

References Cited

UNITED STATES PATENTS

| | | | | |
|---|---|---|---|---|
| 3,236,766 | 2/1966 | Levin | | 210—6 |
| 3,386,911 | 6/1968 | Albertson | | 210—5 X |
| 3,480,144 | 11/1969 | Barth et al. | | 210—4 |
| 3,423,309 | 1/1969 | Albertson | | 210—5 |
| 3,385,785 | 5/1968 | Forrest et al. | | 210—5 X |
| 3,386,910 | 6/1968 | Forrest | | 210—5 |

REUBEN FRIEDMAN, Primary Examiner

T. G. WYSE, Assistant Examiner

U.S. Cl. X.R.

210—8, 16, 46